United States Patent Office 3,155,729
Patented Nov. 3, 1964

3,155,729
DEHYDRO DERIVATIVES OF D-HOMO-C-NOR-ESTRANES AND INTERMEDIATES THERETO
William F. Johns, Morton Grove, Ill., assignor to G. D. Searle & Co., Chicago, Ill., a corporation of Delaware
No Drawing. Filed Feb. 13, 1961, Ser. No. 88,651
6 Claims. (Cl. 260—590)

The present invention relates to D-homo-C-norsteroids and, more particularly, to dehydro derivatives of D-homo-C-norestranes and to intermediates in their manufacture. These dehydro-D-homo-C-norestranes can be represented by the structural formula

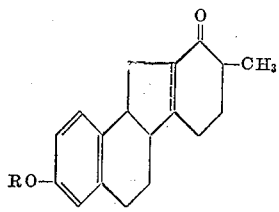

wherein R is a lower alkyl radical and the dotted line indicates the optional presence of a doubly-bonded linkage between carbon atoms 13 and 14.

The lower alkyl radicals represented by R are exemplified by methyl, ethyl, propyl, butyl, pentyl, hexyl, and the branched chain isomers thereof.

Starting materials suitable for the manufacture of the instant compounds are the 3-alkyl ethers of 17$\beta$-methylestra-1,3,5(10),13-tetraen-3-ol. Ozonolysis of the latter substances results in the corresponding 3-alkoxy-17$\beta$-methyl - 13,14 - seco - 18-norestra-1,3,5(10)-triene-13,14-diones. An alternate process for the production of the latter diketones is the treatment of the aforementioned 3-alkyl ethers of 17$\beta$-methylestra-1,3,5(10),13-tetraen-3-ol with osmium tetroxide to afford the 3-alkyl ethers of 17$\beta$-methylestra-1,3,5(10)-triene-3,13,14-triol, which are then allowed to react with periodic acid. These diketones can be cyclized, suitably by means of aqueous potassium hydroxide in methanol, to afford the corresponding 3-alkyl ethers of 3,14$\alpha$-dihydroxy-17$\beta$-methyl-D-homo-C,18-bisnorestra - 1,3,5(10) - trien - 17a - one, the dehydration of which produces the instant 3-alkoxy-17$\beta$-methyl-D-homo-C-norestra - 1,3,5(10),13 - tetraen-17a-ones. Heating the latter substances in a methanolic solution containing aqueous potassium hydroxide at the reflux temperature results in the corresponding 8$\alpha$-epimers, while catalytic hydrogenation in the presence of a suitable catalyst such as 5% palladium-on-carbon affords the instant 3-alkoxy-17$\beta$ - methyl - D - homo - C,18 - bisnorestra - 1,3,5(10)-trien-17a-ones.

A specific example of the process described supra involves the conversion of 17$\beta$-methylestra-1,3,5(10),13-tetraen-3-ol 3-methyl ether to 3-methoxy-17$\beta$-methyl-13,14-seco-18-norestra-1,3,5(10)-triene - 13,14 - dione, either directly by treatment with ozone or, alternatively, by conversion to the intermediate 17$\beta$-methyl-18-norestra-1,3,5(10)-triene-3,13,14-triol 3-methyl ether by means of osmium tetroxide, and treatment of the latter intermediate with periodic acid. This 13,14-dione is allowed to react with aqueous potassium hydroxide in methanol at room temperature to yield the instant 14$\alpha$-hydroxy-3-methoxy-17$\beta$ - methyl - D - homo-C,18-bisnorestra-1,3,5(10)-trien-17a-one, which reacts further to produce 3-methoxy-17$\beta$-methyl - D - homo - C - norestra - 1,3,5(10),13 - tetraen-17a-one. Heating a methanolic solution of the latter substance with aqueous potassium hydroxide yields 3-methoxy - 17$\beta$ - methyl - 8$\alpha$ - D - homo - C - norestra - 1,3,5(10),13-tetraen-17a-one, which is hydrogenated in the presence of 5% palladium-on-carbon catalyst to produce 3 - methoxy - 17$\beta$ - methyl - 8$\alpha$,13$\alpha$,14$\alpha$ - D - homo - C, 18-bisnorestra-1,3,5(10)-trien-17a-one.

The compounds of the present invention are useful as a result of their valuable pharmacological properties. In particular, they are anti-hormonal agents as evidenced by their ability to inhibit the sodium-retaining activity of desoxycorticosterone acetate. In addition, 14$\alpha$-hydroxy-3 - methoxy - 17$\beta$ - methyl - D - homo - C,18 - bisnorestra-1,3,5(10)-trien-17a-one and 3-methoxy-17$\beta$-methyl-13,14-seco-18-norestra-1,3,5(10)-triene-13,14-dione are useful as intermediates in the manufacture of the instant D-homo-C-nor compounds.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

To a solution of 9.4 parts of 17$\beta$-methylestra-1,3,5(10), 13-tetraen-3-ol 3-methyl ether in 105 parts of ether is added 8.9 parts of osmium tetroxide, and the resulting mixture is stirred at room temperature for about 15 hours, then diluted successively with 320 parts of ethanol and a solution of 10 parts of sodium sulfite in 200 parts of water. This aqueous mixture is then heated at reflux for about one hour, filtered, and the filtrate is concentrated in vacuo to about 50 parts by volume, then diluted with water, and extracted with 50% ethyl acetate in benzene. This organic solution is washed with water, dried over anhydrous magnesium sulfate, and concentrated to dryness in vacuo to afford a semi-crystalline residue of 17$\beta$ - methyl - 18 - norestra - 1,3,5(10) - triene - 3,13,14-triol 3-methyl ether. Chromatography of the latter material on silica gel followed by elution of the column with 5% ethyl acetate in benzene affords a fraction, which is recrystallized from acetone-petroleum ether to yield pure 17$\beta$ - methyl - 18 - norestra - 1,3,5(10) - triene - 3,13$\alpha$, 14$\alpha$-triol 3-methyl ether, M.P. about 126–128°. It exhibits infrared maxima at about 2.83 and 2.99 microns.

Further elution of the chromatographic column with 10% ethyl acetate in benzene followed by concentration of the eluate and recrystallization of the resulting residue from acetone-petroleum ether produces the epimeric 17$\beta$-methyl-18-norestra-1,3,5(10)-triene - 3,13$\beta$,14$\beta$ - triol 3-methyl ether, M.P. about 136–138°. This substance is characterized by a maximum in the infrared at about 3.00 microns.

Example 2

To a solution of 3.5 parts of 17$\beta$-methyl-18-norestra-1,3,5(10)-triene-3,13$\alpha$,14$\alpha$-triol 3-methyl ether in 400 parts of methanol containing 40 parts of pyridine is added a solution of 5 parts of periodic acid in 100 parts of water, and the resulting mixture is stored at room temperature for about 22 hours. Dilution of the mixture with water effects crystallization of the product which is collected by filtration and recrystallized from acetone-petroleum ether to yield pure 3-methoxy-17$\beta$-methyl-13,14-seco-18-norestra-1,3,5(10)-triene-13,14-dione, M.P. about 139–141°. The latter compound displays infrared maxima at about 5.86 and 5.90 microns.

Example 3

Through a solution of 3.1 parts of 17$\beta$-methyl-estra-1,3,5(10),13-tetraen-3-ol 3-methyl ether in 200 parts of methylene chloride and 40 parts of methanol is passed a stream of oxygen containing ozone, at −70°, at such a rate that 0.75 part of ozone is introduced over a period of 20 minutes. This solution is then treated successively with 10 parts of zinc dust and a solution of 10.5 parts of acetic acid in 13.4 parts of methylene chloride, and the resulting mixture is stirred for about 30 minutes, during which time the temperature is allowed to rise to 5°. Filtration of this mixture affords a solution, which is washed with aqueous potassium bicarbonate, dried over anhydrous sodium sulfate, and concentrated to dryness in vacuo. Chromatography of the residue on silica gel followed by elution of the column with 2% ethyl acetate in benezene affords a fraction, which is recrystallized from acetone-petroleum ether to afford pure 3-methoxy-17β-methyl-13,14-seco-18-norestra-1,3,5(10)-triene - 13, 14-dione, identical with the product of Example 2.

*Example 4*

To a solution of 1.5 parts of 3-methoxy-17β-methyl-13,14-seco-18-norestra-1,3,5(10)-triene-13,14-dione in 60 parts of methanol is added 7.5 parts of 1% aqueous potassium hydroxide, and the resulting mixture is stirred at room temperature for about 10 minutes, then diluted successively with water and dilute hydrochloric acid. The resulting precipitate is collected by filtration, dried, and chromatographed on silica gel. Elution of the chromatographic column with 2% ethyl acetate in benzene followed by recrystallization of the resulting fraction from acetone-petroleum ether produces pure 3-methoxy-17β-methyl-D-homo - C - norestra-1,3,5(10),13-tetraen-17a-one, M.P. about 140–142°. This substance exhibits infrared maxima at about 6.03 and 6.19 microns and ultraviolet maxima at about 225, 231, and 252 millimicrons.

Further elution of the chromatographic column with 5% ethyl acetate in benzene yields a solid product, which is recrystallized from acetone-petroleum ether to yield 14α - hydroxy-3-methoxy-17β-methyl-D-homo-C,18 - bis-norestra-1,3,5(10)-trien-17a-one, M.P. about 117–119°. Infrared maxima are observed at about 2.85 and 5.89 microns.

*Example 5*

A mixture containing 5 parts of 3-methoxy-17β-methyl-D-homo-C-norestra-1,3,5(10),13 - tetraen - 17a - one, 800 parts of methanol, and 100 parts of 5% aqueous potassium hydroxide is heated at reflux, under nitrogen, for about one hour, then cooled and diluted with water. The resulting precipitate is collected by filtration and recrystallized from petroleum ether to yield 3-methoxy-17β-methyl-8α-D-homo-C-norestra-1,3,5(10),13-tetraen - 17a-one, M.P. about 93–95°. This substance is characterized by infrared maxima at about 6.00, 6.10 and 6.21 microns and ultraviolet maxima at about 227 and 250 millimicrons.

*Example 6*

To a solution of 2.6 parts of 3-methoxy-17β-methyl-8α-D-homo-C-norestra-1,3,5(10),13-tetraen - 17a - one in 240 parts of ethanol is added 3 parts of 5% palladium-on-carbon catalyst, and the mixture is stirred in a hydrogen atmosphere until the absorption of gas ceases. The catalyst is removed by filtration, and the filtrate is concentrated to dryness in vacuo. The resulting residue is chromatographed on silica gel and eluted with benzene to produce 3-methoxy-17β-methyl-8α,-13α,14α-D-homo-C,18-bisnorestra-1,3,5(10)-trien-17a-one, M.P. about 88–93°; $[\alpha]_D = +25°$.

The substitution of an equivalent quantity of 3-methoxy-17β - methyl - D - homo-C-norestra-1,3,5(10),13-tetraen-17a-one in the process of this example results in 3-methoxy-17β-methyl-D-homo-C,18 - bisnorestra - 1,3,5(10)-trien-17a-one.

*Example 7*

The substitution of 17β-methylestra-1,3,5(10),13-tetraen-3-ol 3-ethyl ether in the process of Example 1 affords 17β-methyl-18-norestra-1,3,5(10)-triene-3,13,14 - triol 3-ethyl ether, which is converted by the processes of Examples 2, 4, 5, and 6 to the corresponding 3-ethyl ethers of this invention.

What is claimed is:

1. A member selected from the group consisting of compounds represented by the structural formulas

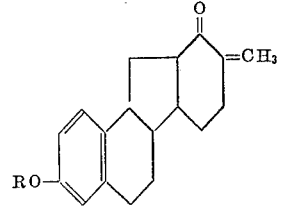

and

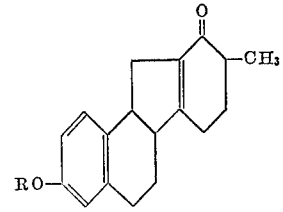

wherein R is a lower alkyl radical.

2. 3 - methoxy - 17β - methyl - D - homo - C - norestra-1,3,5(10),13-tetraen-17a-one.

3. 3-methoxy - 17β - methyl - 8α - D - homo-C-norestra-1,3,5(10),13-tetraen-17a-one.

4. 3 - methoxy - 17β - methyl - 8α,13α,14α - D - homo-C,18-bisnorestra-1,3,5(10)-trien-17a-one.

5. 14α-hydroxy - 3 - methoxy - 17β - methyl - D - homo-C,18-bisnorestra-1,3,5(10)-trien-17a-one.

6. 3 - methoxy - 17β - methyl - 13,14 - seco-18-norestra-1,3,5(10)-triene-13,14-dione.

References Cited in the file of this patent

Johnson et al.: Journal of the American Chemical Society, vol. 80, pages 661–679 (1958).